M. W. HANKS.
OVEN.
APPLICATION FILED JAN. 30, 1920.

1,375,695.

Patented Apr. 26, 1921.

WITNESSES:
Fred C. Wilharm

INVENTOR
Marshall W. Hanks
BY
Wesley G. Carr
ATTORNEY

UNITED STATES PATENT OFFICE.

MARSHALL W. HANKS, OF MOUNT VERNON, NEW YORK, ASSIGNOR TO HANKSCRAFT COMPANY, A CORPORATION OF WISCONSIN.

OVEN.

1,375,695.  Specification of Letters Patent.  Patented Apr. 26, 1921.

Application filed January 30, 1920. Serial No. 355,070.

*To all whom it may concern:*

Be it known that I, MARSHALL W. HANKS, a citizen of the United States, and a resident of Mount Vernon, in the county of Westchester and State of New York, have invented a new and useful Improvement in Ovens, of which the following is a specification.

My invention relates to ovens and more particularly to electrically-heated ovens, though not necessarily limited to electrical means for producing the heat which is utilized.

My invention is also primarily intended for use in connection with ovens which are employed for cooking food, but is susceptible of use in connection with ovens employed for other treating or heating purposes.

The object of my invention is to provide a simple and reliable means whereby the oven-heating means will be cut off or interrupted when the degree of cooking or other treatment desired has been reached.

It has heretofore been proposed to automatically interrupt the cooking operation by means of a thermostatic controlling device when the article being cooked or treated has reached that condition which makes interruption of the heat application desirable but, in all such devices which have been proposed and utilized, so far as I am aware, the controlling thermostat has been located within the oven and has, therefore, been subject to operation when a certain temperature has been attained within the oven, irrespective of whether the article being cooked or otherwise treated has reached the stage which would justify such interruption.

I propose to locate the controlling thermostat in a separate compartment outside the oven in which the cooking or treating is to be effected and place such compartment in communication with the oven by means of a constricted passage or conduit so that the thermostat will be operated in accordance with the amount or kind of food being cooked or material being treated within the oven.

Figure 1:
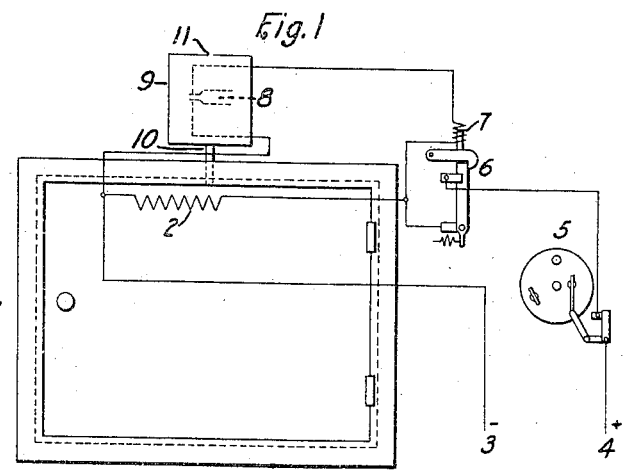
Figure 2:
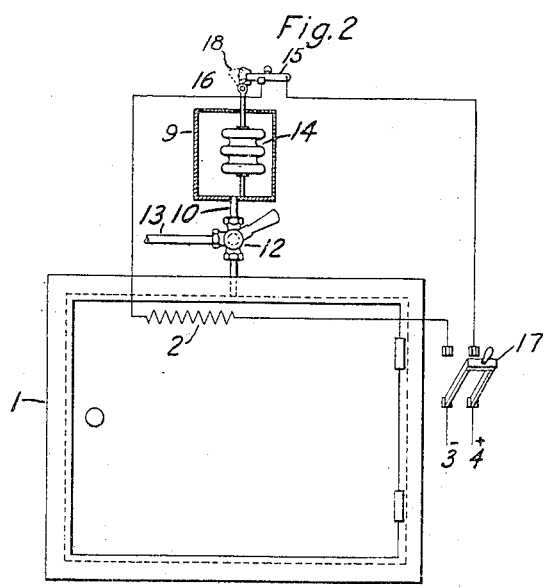

In the accompanying drawing, Figure 1 is a diagrammatic view of an electrically-heated oven and heat-controlling devices constructed and disposed in accordance with my invention; and Fig. 2 is a view, similar to Fig. 1, but showing certain minor modifications.

Referring to the details illustrated in the drawing, and particularly to Fig. 1, the oven 1 may be of any usual or approved construction and may be heated by gas or electricity, preferably the latter, the heating means being here shown as a resistor 2 that is connected to a supply circuit 3—4 which may be connected to any suitable source of electrical energy. Connected in the circuit 3—4 is a circuit-closing time-piece 5 which may be of any usual construction, in order that it may close the heating circuit at any desired instant of time. It will be understood, however, that a manually operated switch may be employed for closing the supply circuit. The conductor 4 is also provided with a circuit breaker 6, the tripping coil 7 of which is connected, through a thermostat 8, to the other side 3 of the supply circuit. The thermostat 8 is located within a receptacle 9 which is outside the oven 1 and is connected to the interior of the oven by means of a relatively small pipe or conduit 10 and to the outside atmosphere by a small opening 11.

The operation of the system will be readily understood and will, therefore, require only a brief description. The heat generated in the oven 1, provided no food or other steam or vapor-producing object or substance is located therein, will not enter the receptacle 9 sufficiently to cause the thermostat 8 to close the circuit of the tripping coil 7, but, if food is located in the oven the steam produced by the cooking operation will be given off so as to pass through the conduit 10 into the chamber 9 and, when the cooking has been continued for a sufficient length of time, the steam accumulated in the chamber 8 will serve to operate the thermostat and thus close the circuit of the tripping coil 7 which will operate to trip the circuit-breaker 6 and thus open the circuit 3—4. If the object or material being cooked in the oven is relatively large, it will take a greater length of time to raise its mass to such temperature as to produce sufficient steam to operate the thermostat and, consequently, the oven will be continued in operation a length of time which corresponds to the quantity of food being cooked therein, which is a condition to be desired.

In Fig. 2 of the drawing, the oven 1, the heat-generating element 2, the supply circuit 3—4 and the thermostat-containing chamber 9 may have the same relations and functions as the corresponding elements shown in Fig. 1 but, as here shown, the pipe or conduit 10, which connects the chamber 9 with the oven 1, is provided with a valve 12 from which leads an escape pipe 13. The valve 12 is provided in order that the effective size of the conduit or passage between the oven 1 and the chamber or receptacle 9 may be varied to suit various conditions of operation, as desired, and so that either the chamber or the oven may be vented to the atmosphere through the pipe 13.

The modification shown in Fig. 2 embodies also a thermostat in the form of a bellows 14, preferably of thin metal, which contains a fluid, such, for example, as ether, which vaporizes or otherwise expands when exposed to a predetermined temperature which will usually approximate 212 F.

One side of the bellows may be fastened to a wall of the chamber 9 and the other side may be attached to the movable member 15 of a switch 16 in the supply conductor 4 so that the expansion of the fluid in the bellows, under the influence of a predetermined temperature in the chamber 9, will move the member 15 to its open-circuit position. It will be understood that the supply circuit will be closed automatically when the temperature in the chamber 9 decreases below a predetermined point because of interruption of the supply circuit, provided the pivoted catch 18 is in the position shown in the drawing by the full lines, to the repeat position. If the catch 18 is thrown to the off position, as shown by the broken lines, the bellows 14 will return to the normal cold position without closing the supply circuit. Reclosing of the supply circuit may be accomplished by the manual operation of the switch 16 or by a time-keeping device. A hand-operated switch 17 may also be provided for the circuit 3—4 if desired.

It will be readily understood that, in case my device is utilized in connection with a gas-heated oven, the tripping coil 7 of Fig. 1, the bellows 14 of Fig. 2 or any other suitable means may be utilized for operating a gas cock to cut off the supply of gas to the burners which heat the oven instead of opening the circuit of an electric heater, as specifically shown.

It will also be understood that the various devices shown and described are merely indicative of suitable means for performing the functions that pertain to my invention, and, consequently, that they may be further modified, if desired, within the scope of the appended claims.

I claim as my invention:

1. The combination with an electrically heated oven, of a circuit-controlling means comprising a thermostat and a chamber containing the thermostat and connected to the oven by a relatively small conduit.

2. The combination with an oven, and an external chamber connected thereto by a relatively constricted passage, of an electric heater in said oven, a thermostat in said chamber, and means controlled by said thermostat for interrupting the heater circuit.

3. The combination with an electrically heated oven, an external chamber connected to the oven by a relatively small conduit, means for regulating the flow of fluid through said conduit, and circuit-controlling means including a thermostat located in said external chamber.

4. The combination with an electrically heated oven and an external chamber connected to said oven by a constricted passage, a thermostat located in said external chamber and a circuit interrupter governed by said thermostat.

5. The combination with an electrically heated oven and an external chamber in constricted communication therewith, of means for regulating or interrupting said communication, and a heat-controlling means comprising a thermostat which is located in said external chamber.

6. The combination with an oven and an external chamber in constricted communication therewith, of heat-controlling means comprising a thermostat which is located in said external chamber.

In testimony whereof I have hereunto subscribed my name this 3rd day of January, 1920.

MARSHALL W. HANKS.